(12) United States Patent
Sarker et al.

(10) Patent No.: US 12,363,041 B2
(45) Date of Patent: Jul. 15, 2025

(54) POLICY PROVISIONING TO A MOBILE COMMUNICATION SYSTEM

(71) Applicant: Telefonaktiebolaget LM Ericsson (publ), Stockholm (SE)

(72) Inventors: Zaheduzzaman Sarker, Järfälla (SE); Attila Mihály, Dunakeszi (HU); Miguel Angel Muñoz De La Torre Alonso, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/012,681

(22) PCT Filed: Jun. 26, 2020

(86) PCT No.: PCT/EP2020/068017
§ 371 (c)(1),
(2) Date: Dec. 23, 2022

(87) PCT Pub. No.: WO2021/259489
PCT Pub. Date: Dec. 30, 2021

(65) Prior Publication Data
US 2023/0261997 A1 Aug. 17, 2023

(51) Int. Cl.
*H04W 12/033* (2021.01)
*H04L 47/20* (2022.01)
(Continued)

(52) U.S. Cl.
CPC .......... *H04L 47/20* (2013.01); *H04L 47/2475* (2013.01); *H04L 47/2483* (2013.01);
(Continued)

(58) Field of Classification Search
None
See application file for complete search history.

(56) References Cited

U.S. PATENT DOCUMENTS 11,284,254 B2 * 3/2022 Rune ...................... H04W 12/06
11,706,309 B2 * 7/2023 Muñoz De La Torre Alonso ....... H04L 43/0876 709/223

(Continued)

FOREIGN PATENT DOCUMENTS

EP 3 468 236 A1 4/2019
WO WO-2021009553 A1 * 1/2021 ............. H04L 47/10

OTHER PUBLICATIONS

International Search Report and Written Opinion issued in International Application No. PCT/EP2020/068017 dated Mar. 3, 2021 (14 pages).
(Continued)

*Primary Examiner* — Shirley X Zhang
(74) *Attorney, Agent, or Firm* — Sage Patent Group

(57) ABSTRACT

A method for providing a policy rule from a User Equipment to a mobile communication system. The method includes establishing a communication channel between the UE and a User Plane entity of the mobile communication system, sending the policy rule through the communication channel from the UE to the UP entity and receiving at the UE from the UP entity an indication of whether the policy rule is accepted or rejected. The UP entity may send the policy rule to a first Control Plane entity for authorization. In turn, the first CP entity may send the policy rule to a second Control Plane entity for authorization. The User Plane entity may be a User Plane Function including a Collaborative Performance Enhancement (COPE) entity.

20 Claims, 7 Drawing Sheets

(51) Int. Cl.
*H04L 47/2475* (2022.01)
*H04L 47/2483* (2022.01)
*H04L 67/141* (2022.01)
*H04W 12/088* (2021.01)

(52) U.S. Cl.
CPC ......... *H04L 67/141* (2013.01); *H04W 12/033* (2021.01); *H04W 12/088* (2021.01)

(56) References Cited

U.S. PATENT DOCUMENTS

| | | | |
|---|---|---|---|
| 12,015,971 B2* | 6/2024 | Puente Pestaña | H04W 8/08 |
| 2018/0069798 A1 | 3/2018 | Bacik et al. | |
| 2018/0192390 A1 | 7/2018 | Li et al. | |
| 2019/0028440 A1* | 1/2019 | Eriksson | H04L 63/0485 |
| 2020/0059761 A1* | 2/2020 | Li | H04W 4/24 |
| 2020/0359264 A1* | 11/2020 | Rácz | H04W 76/16 |
| 2020/0413466 A1* | 12/2020 | Yu | H04W 76/16 |
| 2022/0095111 A1* | 3/2022 | Fu | H04W 36/0011 |
| 2022/0116327 A1* | 4/2022 | Salkintzis | H04W 28/0215 |
| 2022/0385741 A1* | 12/2022 | Muñoz De La Torre Alonso | H04L 41/0894 |
| 2022/0386166 A1* | 12/2022 | Sarker | H04L 69/164 |
| 2022/0394088 A1* | 12/2022 | Salkintzis | H04W 4/021 |
| 2023/0074838 A1* | 3/2023 | De Foy | H04L 69/164 |
| 2023/0388786 A1* | 11/2023 | Ihlar | H04L 63/0281 |
| 2024/0121309 A1* | 4/2024 | Muñoz De La Torre Alonso | H04L 69/14 |
| 2024/0314677 A1* | 9/2024 | Mun | H04W 12/06 |

OTHER PUBLICATIONS

Ericsson, "(pCR) Conditional and Dynamic Policies for Application Instances", 3GPP TSG-SA4 Meeting #99, S4-180866, Rome, Italy Jul. 9-13, 2018 (4 pages).

3GPP TSG 23.501 V16.4.0 (Mar. 2020), 3rd Generation Partnership Project; Technical Specification Group Services and System Aspects; System architecture for the 5G System (5GS); Stage 2 (Release 16), Mar. 2020 (430 pages).

3GPP TSG 23.503 V16.4.1 (Apr. 2020), 3rd Generation Partnership Project; Technical Specification Group Services and System Aspects; Policy and charging control framework for the 5G System (5GS); Stage 2 (Release 16), Apr. 2020 (115 pages).

Ruth, J., "How much of the Internet is using QUIC?", APNIC Blog, May 15, 2018 (6 pages).

Rüth, J. et al., "A First Look at QUIC in the Wild", Feb. 24, 2019 (12 pages).

3GPP TS 29.244 V16.2.0 (Dec. 2019), 3rd Generation Partnership Project; Technical Specification Group Core Network and Terminals; Interface between the Control Plane and the User Plane Nodes; Stage 3 (Release 16), Dec. 2019 (281 pages).

* cited by examiner

POLICY PROVISIONING TO A MOBILE COMMUNICATION SYSTEM

TECHNICAL FIELD

The present invention generally relates to policy management in a mobile communication system, and more specifically, the invention relates to policy requests from a content provider to the mobile communication system.

BACKGROUND

Quick User Datagram Protocol (UDP) Internet Connections (QUIC) is a general-purpose transport layer network protocol. While it may be referred to as the acronym for Quick User Datagram Protocol (UDP) Internet Connections, some organizations (e.g., Internet Engineering Task Force, IETF) refer to QUIC as the name of the protocol without treating it as an acronym. QUIC may be viewed as similar to Transmission Control Protocol (TCP)+enhancement such as Transport Layer Security (TLS) and/or Hypertext Transfer Protocol 2.0 (HTTP/2 or HTTP/2.0) but implemented on top of UDP. QUIC is therefore a UDP based stream-multiplexed and secure transport protocol with integrity protected header and encrypted payload. Yet unlike the traditional transport protocol stack with TCP (Transmission Control Protocol), which resides in the operating system kernel, QUIC can easily be implemented in the application layer. Consequently, this improves flexibility in terms of transport protocol evolution with implementation of new features, congestion control, deployment, and adoption. QUIC uses Transport Layer Security (TLS) for security handshake by default. TLS exchanges the necessary keying material in the protocol's handshake. The use of TLS (defined in IETF Request for Comments (RFC) 8446) or Datagram TLS (DTLS) (under discussion, see IETF Internet-Draft draft-ietf-tls-dtls13-31 dated Mar. 25, 2019) is very common as a transport security solution independent from the underlying transport protocol being TCP or UDP. Note that HTTP-over-QUIC is sometimes referred to as HTTP/3 as approved by IETF.

While QUIC standardization efforts started less than 7 years ago, presently it represents nearly 10% of the Internet traffic pushed by large Internet domains. QUIC is becoming a main transport protocol in the Internet's user plane. Many applications running today over HTTP/HTTPS may migrate to QUIC, driven by QUIC's latency improvements and stronger security. Notably, encryption in QUIC covers both the transport protocol headers as well as the payload, as opposed to TLS over TCP (e.g., HTTPS), which protects only the payload.

A proxy is an intermediary program/software (or hardware such as a network node implementing such intermediary program/software) acting as a server, a client, or a combination of the server or client for some functionalities as the proxy may create or simply relay requests on behalf of other entities. The proxy may be implemented on a path between a server and a client. Note that each of the client, server, and proxy may be implemented in one or more network nodes such as client nodes, server nodes, and intermediate (on-path) nodes, respectively. Each of a server or client node may be referred to as an endpoint node.

Requests are serviced internally or by passing them on, with possible translation, to other servers. There are several types of proxies, including the following: (1) A "transparent proxy" is a proxy that does not modify the request or response beyond what is required for proxy authentication and identification; (2) A "non-transparent proxy" is a proxy that modifies the request or response to provide some added service to the user agent, such as group annotation services, media type transformation, protocol reduction, or anonymity filtering; (3) A "reverse proxy" basically is a proxy that pretends to be the actual server (as far as any client or client proxy is concerned), but it passes on the request to the actual server that is usually sitting behind another layer of firewalls; and (4) A "performance enhancement proxy" (PEP) is used to improve the performance of protocols on network paths (e.g., where native performance suffers due to characteristics of a link or subnetwork on the path).

A Collaborative Performance Enhancement (COPE) node or function is an entity which resides between two endpoints, usually in a client and server setup but also in a peer to peer communication setup, that use encrypted communication. The communicating parties (usually the client) explicitly contact the proxy in order to request a network-support service. This service at a minimum always includes forwarding of the encrypted traffic to a specific server, e.g. also in cases where the server is otherwise not directly reachable. In addition, the endpoints can share traffic information with the COPE entity such that the COPE entity can execute a requested performance enhancement function to improve the QoS of the traffic as well as optimize operations within the network. Alternatively, also the COPE node can provide additional information about the network which enables the endpoint to optimize its data transfer, e.g. use a more optimized congestion control or delay pre-fetching activities.

Usually it is expected that a client learns about the existence of a COPE service either directly from the access network or by other communication with a peer. When a COPE node is detected, the client can open a connection to it, for example a QUIC connection when QUIC is used as a transport protocol and request a service. The communication with the server is realized by an inner transport connection that is encrypted end-to-end between the client and the server.

A COPE node or function (the COPE node/function may also be referred to as a COPE entity) may be implemented in a network device containing a QUIC proxy and/or performance/traffic enhancement features/functions, and the COPE node is an intermediate/on-path node (referred to as a COPE node for it implementing the COPE functions) between two endpoints, usually in a client and server setup but also in a peer to peer communication setup, that use encrypted communication.

One communicating parties (e.g., a client) may explicitly contact an on-path COPE entity in order to request a network-support service. This service, at a minimum, always includes forwarding of the encrypted traffic to a specific server (e.g., when the server is otherwise not directly reachable). In addition, the endpoints can share traffic information with the COPE entity such that the COPE entity can execute a requested enhancement function to improve the QoS of the traffic as well as optimize operations within the network. Alternatively, the COPE entity may provide additional information about the network that enables the endpoint to optimize its data transfer, e.g., use a more optimized congestion control or delay pre-fetching activities.

FIG. 2 shows a placement of proxy node (e.g. UPF, COPE) 204 in a wireless network per one embodiment of the disclosure. A UE 202 (e.g., a QUIC client) may learn about the existence of the proxy node 204 either directly from an access network 290 or by another communication with a peer. The proxy node may provide one or more enhancement functions between the client 202 and server 206. In one embodiment, the proxy node implements a COPE entity. When the proxy node 204 is detected, the client 202 may open a connection to it. For example, when QUIC is used as a transport protocol, a QUIC connection is opened to request a service. The QUIC connection between the client 202 and proxy node 204 uses an outer connection 232 and can exchange information through a stream of that outer QUIC connection. The communication with a server 206 (e.g., a QUIC server) is realized by an inner transport connection 234 that is encrypted end-to-end between the client 202 and the server 206 through a core network 292. The inner transport connection is sent within one stream of the outer QUIC connection. In some embodiments, the proxy that provides the enhancement functions may be implemented between two peer nodes as well. The enhancement functions may assist the client 202 in its session with the server 206.

In this disclosure, the outer connection 232 between the UE and proxy node (e.g. UPF, COPE) is also referred to as communication channel between the UE and proxy node (e.g. UPF, COPE).

The outer connection 232 may be at application level or at network level. Network level refers to the tunneling protocols in the mobile network, for example General Packet Radio Service (GPRS) Tunneling Protocol (GTP) protocol. Application level refers to the traffic that is tunneled using those network level protocols, for example Quick User Datagram Protocol (UDP) Internet Connections (QUIC) protocol.

If the communication channel 232 is established at application level, the data session between the UE 202 and the Application Server (AS) 206 is at application level, and the proxy node (e.g. UPF, COPE) 204 acts as application level proxy in the communication between the UE and the AS.

If the communication channel 232 is established at network level, the data session between the UE 202 and the proxy node (e.g. UPF, COPE) 204 is at network level. The end-to-end traffic between the UE 202 and the AS 206 is tunneled in said network-level data session and the proxy node (e.g. UPF, COPE) 204 acts as a network level gateway in the end-to-end communication between the UE and the AS.

FIG. 3 further shows the network entities in a wireless network per one embodiment of the disclosure. In a wireless network, the UE 302 communicates with application and/or media server 306 through a set of network entities. Each of the application servers 352 may provide one or more services to the application clients in the UE 302. The UE 302 accesses the wireless network through an access network, which includes a base station 322 (e.g., eNodeB). The base station 322 may include a radio network controller (RNC), a base station controller (BSC), and/or other entities. There are a number of Core Network entities 304 within a core network of the wireless network. For example, the SMF 314 may provide management functions for sessions between the applicant clients in the UE 302 and the application servers 352. The PCF 316 provides functions about policy and charging control rules for the sessions, and the UPF 318 monitors the user plane traffic based on the rules received from SMF. The COPE entity 312 may provide enhancement functions for the sessions.

Today's networks do more than just forwarding traffic. It is common practice for a network operator to capture traffic traversing its network for monitoring, inspection and/or classification, so that necessary measures can be taken to ensure good network health and/or user experience. When unencrypted application and/or transport protocols (such as HTTP, partially HTTPS or TCP) are used, network operators usually do not require close collaboration with service providers. However, as service providers are deploying encrypted protocols (such as HTTP/3 or QUIC) at a fast pace, it is becoming more difficult for network operators to use traffic for network monitoring or application optimization purposes in a non-collaborative/transparent way. To use network functions that optimize traffic or provide differential treatment when traffic is encrypted, the network operator and the Over-the-Top (OTT) service provider need to collaborate. Through this kind of collaboration, they can discover, negotiate and configure the existence of a proxy, e.g. a QUIC proxy or a QUIC performance enhancement function, and generally applicable to other protocols as Collaborative Performance Enhancement (COPE) proxy.

OTT services are provided by the service provider across one or multiple IP networks, namely, the Internet. The service provider here is solely responsible for content controlling and distribution and they usually do it by bypassing telecommunication, Internet Service Providers (ISPs) or broadcast channels; treating the Internet as black box. Even though the basic principle of operation is "best effort" both service and network providers deploy many techniques to support QoS guarantees. These include Content Delivery Network (CDN), caching, proxying, load balancing, transport protocol optimization for cellular and satellite networks and other traffic engineering.

3GPP supports an exposure framework between Content Provider(s) and Network Operator(s), which is based on control plane signaling (which is an out-of-band channel separated from the user's data traffic). This framework allows content providers to cooperate with the network operator on policy enforcement and quality assurance. However, one of the reasons this architecture is not used from the beginning of the deployment of an OTT service is, that it requires particular Service Layer Agreements (SLAB) to be signed between multiple, if not all, parties involved.

A problematic aspect is that 3GPP supports a policy (PCC) framework, where the policy controller (PCF) indicates to SMF (and UPF) the policies to be applied for the user's PDU session with a per application granularity, but it does not currently support an efficient mechanism for the content provider to request policies to be applied by the network operator to their applications. The current 5GC policy authorization mechanism is described in 3GPP TS 23.503 and is based on a communication between the PCF and an external Application Function (AF), where the AF requests are conveyed through the NEF. This requires an AF on the content provider side that needs to maintain connectivity to the NEF, and extensive session states based on 5GC exposure functions to the external AF to inform about the application started, UE location, network conditions, etc., and it is therefore not a widely deployed mechanism.

SUMMARY

An object of the invention is to enable the provision of policy rules from a User Equipment to a mobile communication system, being the policy rule applicable to a data session between the UE and an Application Server (AS) and enforceable at a User Plane (UP) entity.

A first aspect of the invention relates to a method performed by a UE for providing a policy rule from the UE to a mobile communication system. The method includes establishing a communication channel with the UP entity of the mobile communication system and sending the policy rule through the communication channel to the UP entity. In an embodiment of the method, the policy rule is sent together with information for identifying and classifying at the UP entity the traffic of the data session between the UE and the AS, particularly wherein the information is one of an application identifier, an AS identifier and a traffic filter. In an embodiment of the method, the communication channel is established at application level, the data session between the UE and the AS is at application level, and the UP entity acts as application level proxy in the communication between the UE and the AS. In an embodiment of the method, the communication channel protocol corresponds to Quick User Datagram Protocol (UDP) Internet Connections (QUIC) protocol, and the data session corresponds to a QUIC connection. In an embodiment of the method, the communication channel is established at network level, the data session between the UE and the AS is at network level, and the UP entity acts as a network level gateway in the communication between the UE and the AS. In an embodiment of the method, the communication channel protocol corresponds to General Packet Radio Service (GPRS) Tunneling Protocol (GTP) protocol, and the data session corresponds to a Packet Data Unit, PDU, session. The method further includes receiving from the UP entity, an indication of whether the policy rule is accepted or rejected by the mobile communication system.

A second aspect of the invention relates to a method performed by a User Plane (UP) entity for handling a policy rule sent from a UE to a mobile communication system, being the policy rule applicable to a data session between the UE and an AS and enforceable at the UP entity. The method includes establishing a communication channel with the UE and receiving the policy rule through the communication channel from the UE. In an embodiment of the method, the policy rule is received together with information for identifying and classifying at the UP entity the traffic of the data session between the UE and the AS, particularly wherein the information is one of an application identifier, an AS identifier and a traffic filter. In an embodiment of the method, the communication channel is established at application level, the data session between the UE and the AS is at application level, and the UP entity acts as application level proxy in the communication between the UE and the AS. In an embodiment of the method, the communication channel protocol corresponds to Quick User Datagram Protocol (UDP) Internet Connections (QUIC) protocol, and the data session corresponds to a QUIC connection. In an embodiment of the method, the communication channel is established at network level, the data session between the UE and the AS is at network level, and the UP entity acts as a network level gateway in the communication between the UE and the AS. In an embodiment of the method, the communication channel protocol corresponds to General Packet Radio Service (GPRS) Tunneling Protocol (GTP) protocol, and the data session corresponds to a Packet Data Unit, PDU, session. The method further includes sending to the UE, an indication of whether the policy rule is accepted or rejected by the mobile communication system. The method further includes authorizing the application of the policy rule for the data session between the UE and the AS. In an embodiment of the method, the authorizing step comprises sending to a Control Plane (CP) entity an authorization request for the policy rule for the data session between the UE and the AS and receiving the corresponding authorization response from the CP entity. In an embodiment of the method, the CP entity is a Session Management Function, SMF. The method further includes sending to a Control Plane (CP) entity an authorization request for the policy rule for the data session between the UE and the AS.

A third aspect of the invention relates to a method performed by a Control Plane (CP) entity for authorizing a policy rule for a data session between a User Equipment (UE) and an Application Server (AS). The method includes receiving from a mobile communication entity an authorization request for the policy rule for the data session between the UE and the AS, authorizing the policy rule for the data session between the UE and the AS and sending to the mobile communication entity an authorization response indicating whether the policy rule for the data session between the UE and the AS is accepted or rejected. In an embodiment of the method, the CP entity is a session management entity, the mobile communication entity is a User Plane (UP) entity, the authorizing step comprises sending to a second CP entity an authorization request for the policy rule for the data session between the UE and the AS, and the authorizing step comprises receiving from the second CP entity an authorization response indicating whether the application of the policy rule for the data session between the UE and the AS is accepted or rejected. In an embodiment of the method, the CP entity is a policy control entity, the mobile communication entity is a second CP entity, the authorizing step comprises retrieving from a user data repository the policy rules that apply for the data sessions between the UE and the AS, and the authorizing steps comprises comparing the policy rule with the policy rules retrieved from the user data repository.

Other aspects of the invention relate to mobile network nodes, particularly a UE, a UP entity and a CP entity, each configured to perform the respective methods as described herein. Other aspects of the invention relate to computer program and computer program products.

In some embodiments of these aspects, the UP entity is a User Plane Function (UPF), a COPE entity, or a UPF including a COPE entity. In some embodiments of these aspects, the CP entity is a Session Management Function (SMF) or a Policy Control Function (PCF).

In some embodiments, a policy API sits between the COPE client (at UE) and the COPE entity (at the Core Network) in order to allow the content provider to request policies to the network operator relative to content provider's application traffic.

Advantageously, the solution disclosed herein enables a mechanism for the content provider to request user plane policy rules to be enforced by the network operator relative to the traffic of the content provider's applications, which is quicker and involves less signaling load than existing solutions, since the policy rules can be sent directly from the UE and subsequently authorized and enforced at the UP entity handling the UP connections for that UE.

Further advantageously, the solution disclosed herein enables a mechanism for the content provider to request user plane policy rules to be enforced by the network operator relative to the traffic of the content provider's applications, when the network operator does not support north bound interfaces in the Control Plane for applications to make such policy requests, for example, those interfaces exposed by a Network Exposure Function (NEF).

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The invention may best be understood by referring to the following description and accompanying drawings that are used to illustrate particular embodiments of the invention. In the drawings.

DETAILED DESCRIPTION

The invention will now be described in detail hereinafter with reference to the accompanying drawings, in which examples of embodiments or implementations of the invention are shown. The invention may, however, be embodied or implemented in many different forms and should not be construed as limited to the embodiments set forth herein. Rather, these embodiments are provided so that this disclosure will be thorough and complete, and will fully convey the scope of present invention to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
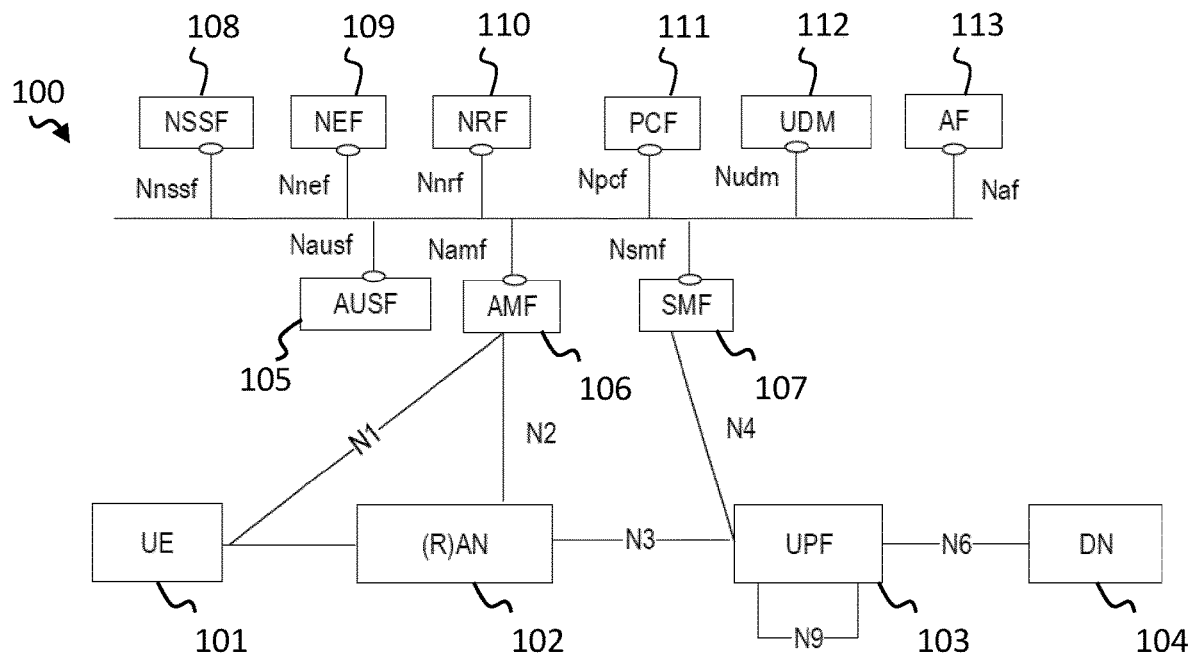
FIG. 1 is a networked system in accordance with particular embodiments of the solution described herein.

It will be appreciated that example embodiments described herein arise in the context of a telecommunications network, including but not limited to a telecommunications network that conforms to and/or otherwise incorporates aspects of a fifth generation (5G) architecture. FIG. 1 is an example networked system 100 in accordance with example embodiments of the present disclosure. FIG. 1 specifically illustrates User Equipment (UE) 101, which may be in communication with a (Radio) Access Network (RAN) 102 and Access and Mobility Management Function (AMF) 106 and User Plane Function (UPF) 103. The AMF 106 may, in turn, be in communication with core network services including Session Management Function (SMF) 107 and Policy Control Function (PCF) 111. The core network services may also be in communication with an Application Server/Application Function (AS/AF) 113. Other networked services also include Network Slice Selection Function (NSSF) 108, Authentication Server Function (AUSF) 105, User Data Management (UDM) 112, Network Exposure Function (NEF) 109, Network Repository Function (NRF) 110 and Data Network (DN) 104. In some example implementations of embodiments of the present disclosure, an AMF 106, SMF 107, UPF 103, PCF 111, AUSF 105, NRF 110, UDM 112, NEF 109, AF 113, and NSSF 108 are each considered to be an NF. It will be appreciated that one or more additional network functions (NF) may be incorporated into the networked system.

The solution described herein aims to allow policy requests from the UE side. The use of such a solution may be for content providers to request policies to the communications network by means of a client application installed in the UE. Examples of such policy requests may be for example the enforcement of specific Quality of Service parameters, or the application of specific traffic routing rules.

To achieve such object, this disclosure provides a method performed by a User Equipment (UE) 401, a User Plane (UP) entity 402, and Control Plane (CP) entities 409. In some embodiments, the UP entity is a UPF 402. In some embodiments, the Control Plane (CP) entities are an SMF 403, PCF 404 and UDR 405. Another entity taking part of the solution is an Application Server (AS) 406.

The method comprises establishing a communication channel from the UE with the UP entity of a mobile communication system; and sending a policy rule through the communication channel from the UE to the UP entity. In some embodiments of the method, the policy rule is sent together with information for identifying and classifying at the UP entity the traffic of the data session between the UE and the AS, particularly wherein the information is one of an application identifier, an AS identifier and a traffic filter. In some embodiments of the method, the communication channel is established at application level, the data session between the UE and the AS is at application level, and the UP entity acts as application level proxy in the communication between the UE and the AS. In some embodiments of the method, the communication channel protocol corresponds to Quick User Datagram Protocol, UDP, Internet Connections, QUIC, protocol, and the data session corresponds to a QUIC connection. In some embodiments of the method, the communication channel is established at network level, the data session between the UE and the AS is at network level, and the UP entity acts as a network level gateway in the communication between the UE and the AS. In some embodiments of the method, the communication channel protocol corresponds to General Packet Radio Service, GPRS, Tunnelling Protocol, GTP, protocol, and the data session corresponds to a Packet Data Unit, PDU, session. In some embodiments the method further comprises receiving at the UE from the UP entity, an indication of whether the policy rule is accepted or rejected by the mobile communication system. In some embodiments the method further comprises authorizing from the UP entity the application of the policy rule for the data session between the UE and the AS. In some embodiments of the method, the authorizing step comprises sending to a Control Plane, CP, entity an authorization request for the policy rule for the data session between the UE and the AS. In some embodiments of the method, the CP entity is a Session Management Function, SMF. In some embodiments the method further comprises receiving from the CP entity an authorization response indicating whether the application of the policy rule for the data session between the UE and the AS is accepted or rejected. In some embodiments the method further comprises sending from the UP entity to the UE, an indication of whether the policy rule is accepted or rejected by the mobile communication system. In some embodiments the method further comprises receiving at the CP entity from a mobile communication entity an authorization request for the policy rule for the data session between the UE and the AS; authorizing the policy rule for the data session between the UE and the AS; and sending to the mobile communication entity an authorization response indicating whether the policy rule for the data session between the UE and the AS is accepted or rejected. In some embodiments of the method, the CP entity is a session management entity, the mobile communication entity is a User Plane, UP, entity, the authorizing step comprises sending to a second CP entity an authorization request for the policy rule for the data session between the UE and the AS, and the authorizing step comprises receiving from the second CP entity an authorization response indicating whether the application of the policy rule for the data session between the UE and the AS is accepted or rejected. In some embodiments of the method, the CP entity is a policy control entity, the mobile communication entity is a second CP entity, the authorizing step comprises retrieving from a user data repository the policy rules that apply for the data sessions between the UE and the AS, and the authorizing steps comprises comparing the policy rule with the policy rules retrieved from the user data repository.

This disclosure also provides mobile network nodes, particularly a User Equipment (UE) 401, a User Plane (UP) entity 402, and Control Plane (CP) entities 403 and 404, each configured to perform their respective methods as described in this disclosure. This disclosure also provides the corresponding computer program and computer program products comprising code, for example in the form of a computer program, that when run on processing circuitry of the mobile network nodes causes the mobile network nodes to perform the disclosed methods.

In some embodiments the mobile network incorporates a COPE. In some embodiments, the COPE is a proxy at network operator premises. Different deployments for the proxy may be an implementation at UPF/PGW-U, for example as a service assuming a service based UPF, as a module, or as a library, as an embedded SF (Service Function) in a service chaining architecture, as an external SF (Service Function) in a service chaining architecture or as an AF (Application Function).

In some embodiments, a policy API sits between the COPE client/server (at content provider) and the COPE entity (at network operator) in order to allow the content provider to request policies to the network operator relative to content provider's application traffic. Some embodiments may include a mechanism (at network operator) to authorize the requested policies.

In some embodiments, the policy API terminates at UPF. That is, the COPE entity at UPF terminates the policy API. In some embodiments, the policy API terminates at SMF. That is, the Policy API is terminated at SMF by configuring UPF to forward to SMF the original policy request message from the content provider. In some embodiments, the UPF decrypts the policy request before forwarding it to SMF. In some embodiments, the PFCP protocol is extended, specifically the FAR to include a (new) Decrypt IE. In some embodiments, the policy API terminates at a separate SF. In this scenario, the COPE is implemented as a separate SF that may be still embedded in the UPF to leverage on some internal service communication capabilities.

In some embodiments, the requested policies are forwarded from the UP entity to a CP entity. In some embodiments, the requested policies are forwarded from UPF to SMF by extending PFCP protocol with a PFCP Session Modification Request message triggered by UPF.

In some embodiments, the requested policies are forwarded from SMF to PCF by extending Npcf with a (new) Npcf_Policy request triggered by SMF. In some embodiments, the requested policies are pre-authorized by CP, e.g. UPF or SMF could have preconfigured policies in order to avoid interaction with PCF.

In some embodiments, the requested policies (by the client) are further conveyed on the CP towards the PCF using Npcf_PolicyAuthorization and then PCF updates the session policies (through SMF). This scenario assumes that the COPE proxy acts as an internal AF towards the PCF potentially discovering the PCF through the BSF.

The solution disclosed herein enables a mechanism for the content provider to request user plane policy rules to be enforced by the network operator relative to the traffic of the content provider's applications, which is quicker and involves less signaling load than existing solutions, since the policy rules can be sent directly from the UE and subsequently authorized and enforced at the UP entity handling the UP connections for that UE.

The solution disclosed herein enables a mechanism for the content provider to request user plane policy rules to be enforced by the network operator relative to the traffic of the content provider's applications, when the network operator does not support north bound interfaces in the Control Plane for applications to make such policy requests, for example, those interfaces exposed by a Network Exposure Function (NEF).

Hereinafter, drawings showing examples of embodiments of the solution are described in detail.

Figure 4:
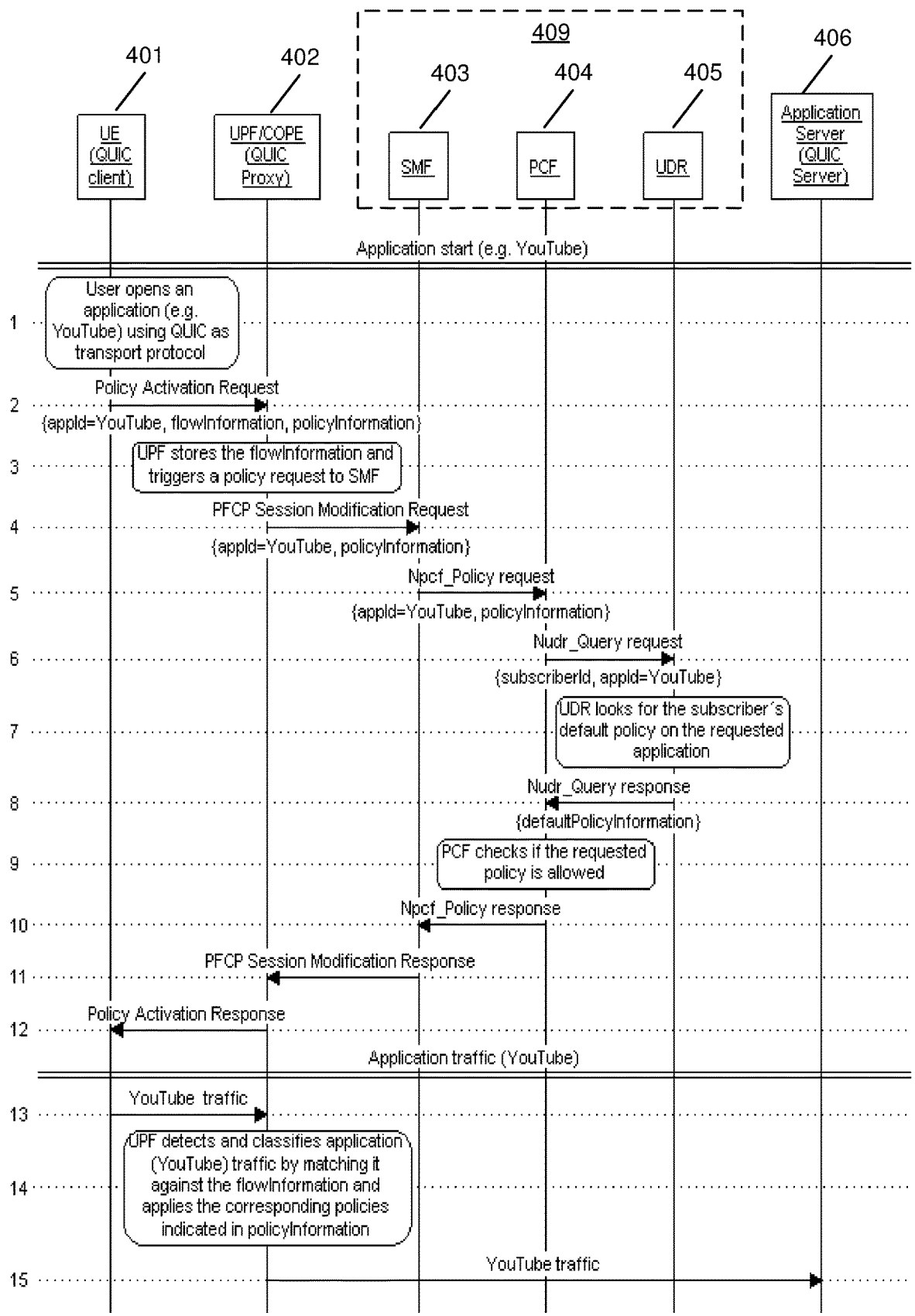
FIG. 4 is a signaling diagram illustrating the procedure of provisioning a policy rule, according to particular embodiments of the solution described herein.

FIG. 4 is a signaling diagram illustrating a procedure for providing a policy rule from a User Equipment (UE) 401 to a mobile communication system, wherein the policy rule is applicable to a data session between the UE and an Application Server (AS) 406 and is enforceable at a User Plane, UP, entity 402. The policy rule is authorized by a mechanism performed by Control Plane (CP) entities 409. The UP entity is a UPF 402. The CP entities are an SMF 403, PCF 404 and UDR 405. The policy API is terminated at UPF and requested policies are forwarded from UP to CP for authorization. An example of a UE application (e.g. YouTube) is used for requesting policies to be enforced by the network operator for the application's traffic. Prior to the execution of this procedure, the content provider may have an SLA in place with the network operator, the UE's PDU session shall be already established and the application client/server (e.g.

Figure 2:
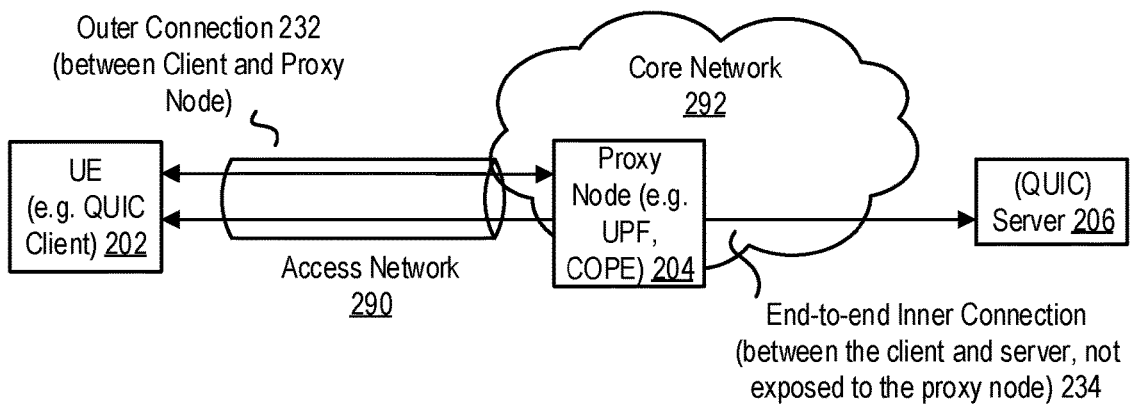
FIG. 2 is a block diagram showing network entities in a mobile communications network, according to particular embodiments of the solution described herein.
Figure 3:
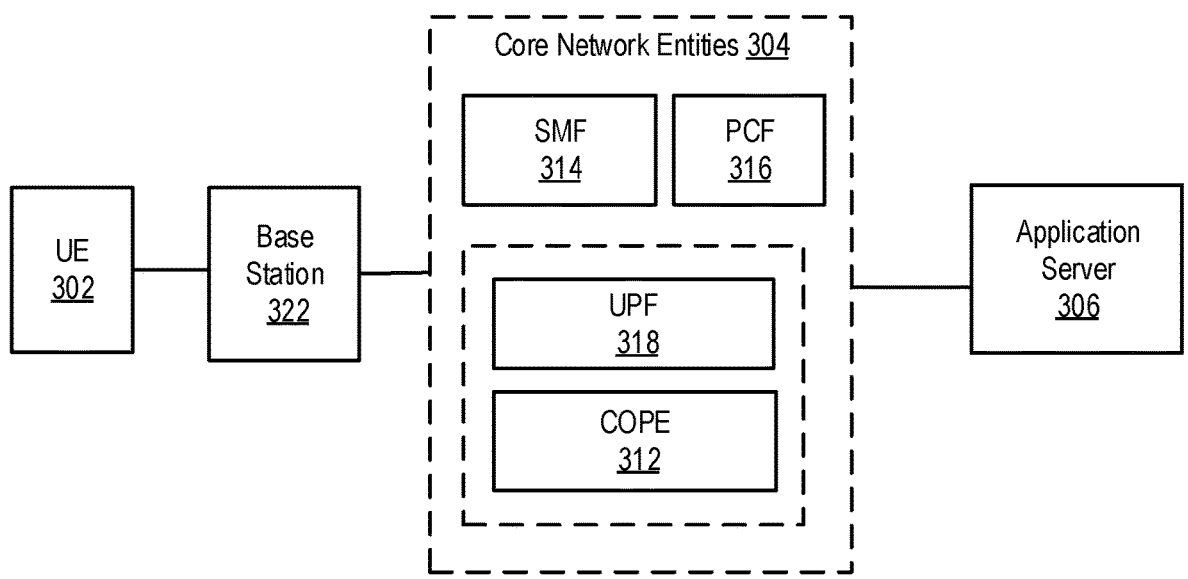
FIG. 3 is a block diagram further showing network entities in a mobile communications network, according to particular embodiments of the solution described herein.

QUIC client/server) has already established inner and outer connections to the COPE (e.g. .QUIC proxy), as indicated in FIG. 2. The COPE is assumed to be integrated in UPF. In some other embodiments, the COPE is an AF or a SF (which could be an embedded SF or external SF to UPF).

At step 1, the UE opens the application (e.g. YouTube) using QUIC as transport protocol.

At step 2, before starting the application traffic (e.g. YouTube traffic), the UE's application entity (e.g. YouTube app), acting as QUIC client, uses the inner QUIC connection with the COPE (acting as QUIC Proxy) at UPF to trigger a Policy Activation Request message, including the following information: appId=YouTube, to identify the application; flowInformation (which includes the flow information, e.g. 5-tuple/s, that will allow the network operator to identify the traffic which corresponds to the above appId); and policy-Information (which includes the policies requested by the content provider to be enforced by the network operator for application's traffic). The policies could be for example a certain QoS or Charging treatment.

At step 3, UPF stores the flowInformation and triggers a policy request to SMF.

At step 4, the UPF sends to SMF a PFCP Session Modification Request including the following information: appId=YouTube, to identify the application; policyInformation (which includes the policies requested by the content provider to be enforced by the network operator for application's traffic). The policies could be for example a certain QoS or Charging treatment.

At step 5, SMF triggers a policy request to PCF by means of a Npcf_Policy request message including the following information: appId=YouTube, to identify the application; policyInformation (which includes the policies requested by the content provider to be enforced by the network operator for application's traffic). The policies could be for example a certain QoS or Charging treatment.

At step 6, based on the received appId, PCF sends to UDR a request for any potential default policy for the appId for this subscriber. PCF triggers a Nudr_Query request message to UDR including the following information: subscriberId, to identify the subscriber; appId=YouTube, to identify the application.

At step 7, UDR looks for the subscriber's default policy for the requested application.

At step 8, UDR replies to PCF with a Nudr_Query response message including defaultPolicyInformation.

At step 9, PCF checks if the requested policy (policyInformation) is allowed (possibly considering the defaultPolicyInformation). In this embodiment it is allowed (e.g. as per SLA).

At step 10, PCF replies to SMF with a Npcf_Policy response message (indicating successful operation).

At step 11, SMF answers UPF with a PFCP Session Modification Response message indicating successful operation.

At step 12, UPF responds to the message in step 2 by triggering a Policy Activation Response (indicating successful operation) to the UE's application entity (YouTube app), acting as QUIC client, using the inner QUIC connection.

At step 13, the UE's application (YouTube app) starts sending application (YouTube) traffic.

At step 14, UPF detects and classifies application (YouTube) traffic by matching it against the flowInformation (previously stored in Step 3) and applies the corresponding policies indicated in policyInformation.

At step 15, UPF forwards the application's traffic towards the Application Server (AS).

In some embodiments, at PDU session establishment, PCF could activate a pre-defined PCC rule for the application (e.g. appId=YouTube), to indicate SMF (and UPF) that it is allowed for the UE's application client to request certain policies (preconfigured at UPF), so they do not need to be checked by PCF and they can be enforced directly. UPF will check the UE's application client requested policies based on this local configuration.

Figure 5:
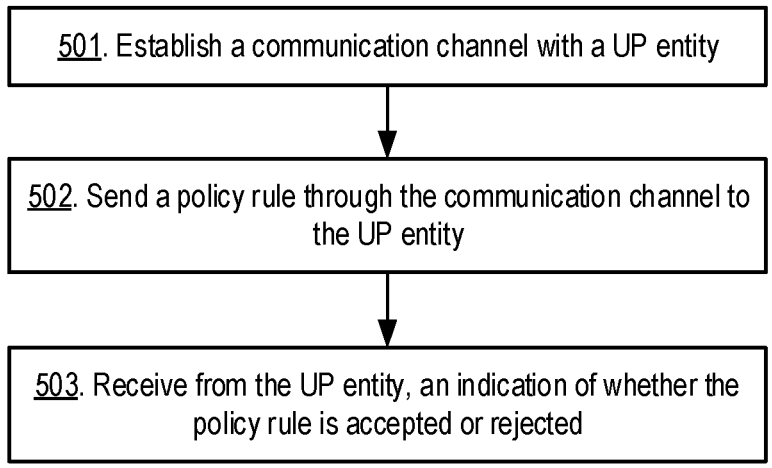
FIG. 5 is a flowchart illustrating a method performed by a UE, according to particular embodiments of the solution described herein.

FIG. 5 is a flowchart illustrating a method performed by a UE for providing a policy rule to a mobile communication system, wherein the policy rule is applicable to a data session between the UE and an Application Server, AS, and is enforceable at a UP entity. In some embodiments, the UP, entity is a UPF.

At step 501, the UE establishes a communication channel with the UP entity of the mobile communication system.

At step 502, the UE sends the policy rule through the communication channel to the UP entity.

At step 503, the UE receives from the UP entity, an indication of whether the policy rule is accepted or rejected by the mobile communication system.

Figure 6:
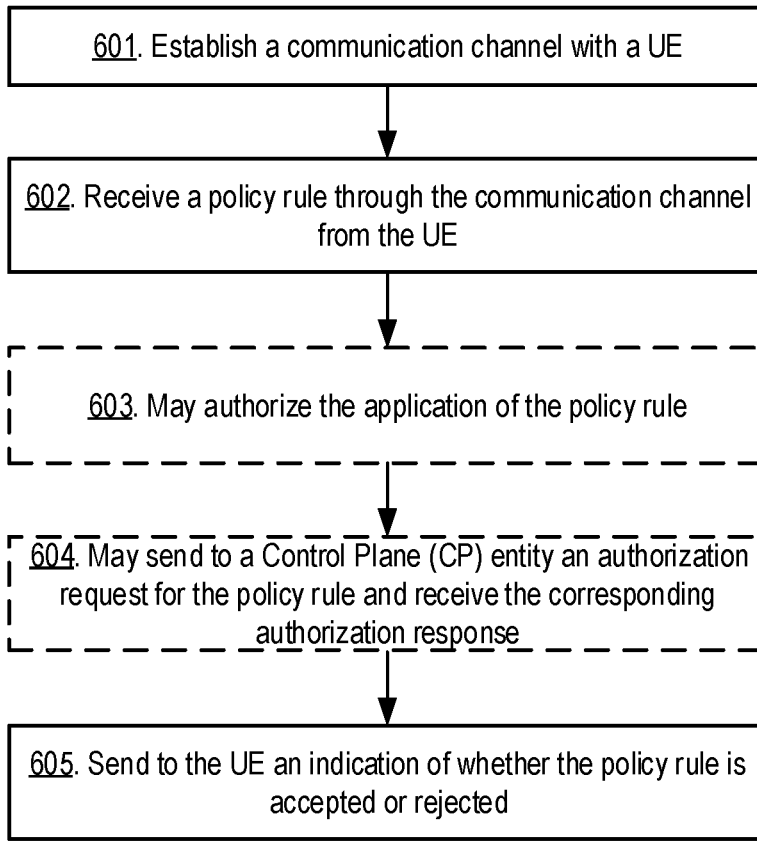
FIG. 6 is a flowchart illustrating a method performed by a User Plane entity, according to particular embodiments of the solution described herein.

FIG. 6 is a flowchart illustrating a method performed by a UP entity for handling a policy rule sent from a UE to a mobile communication system, wherein the policy rule is applicable to a data session between the UE and an Application Server (AS) and is enforceable at the UP entity. In some embodiments, the UP, entity is a UPF.

At step 601, the UP entity establishes a communication channel with the UE.

At step 602, the UP entity receives the policy rule through the communication channel from the UE.

At step 603, the UP entity may authorize the application of the policy rule for the data session between the UE and the AS. In some embodiments, the UP entity already has the proper authorization rules to perform this step without interacting with other entities.

At step 604, the UP entity may send to a Control Plane (CP) entity an authorization request for the policy rule for the data session between the UE and the AS and receives the corresponding authorization response from the CP entity. In some embodiments this step is performed by sending to a Control Plane (CP) entity an authorization request for the policy rule for the data session between the UE and the AS, and subsequently receiving the corresponding authorization response. In some embodiments, the CP entity is an SMF.

At step 605, the UP entity sends to the UE an indication of whether the policy rule is accepted or rejected by the mobile communication system.

Figure 7:
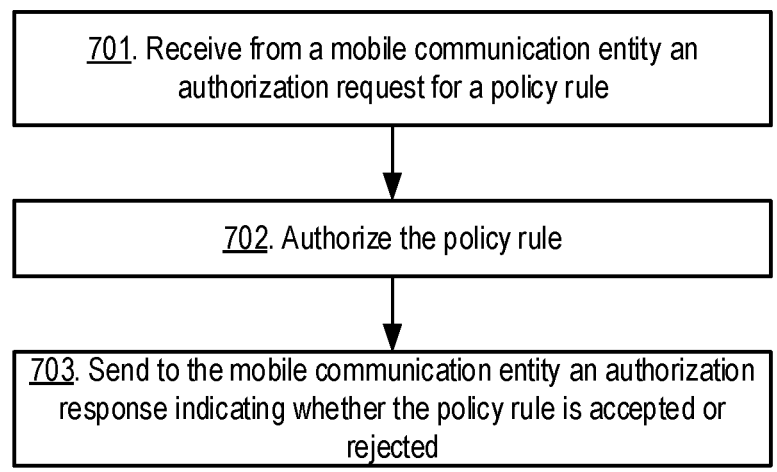
FIG. 7 is a flowchart illustrating a method performed by a Control Plane entity, according to particular embodiments of the solution described herein.

FIG. 7 is a flowchart illustrating a method performed by a CP entity for authorizing a policy rule for a data session between a UE, and an Application Server (AS). The authorization request is received from a mobile communication entity. To authorize the policy rule, the CP entity sends a further authorization request to a second CP entity. In some embodiments, the CP entity is a SMF, the mobile communication entity is a UPF, and the second CP entity is a PCF. In some embodiments, the CP entity is a PCF, the mobile communication entity is a SMF and the second CP entity is a UDR.

At step 701, the CP entity receives from the mobile communication entity an authorization request for the policy rule for the data session between the UE and the AS.

At step 702, the CP entity authorizes the policy rule for the data session between the UE and the AS.

In some embodiments, the CP entity is a session management entity, the mobile communication entity is a UP entity, the authorizing step comprises sending to a second CP entity an authorization request for the policy rule for the data session between the UE and the AS, and the authorizing step comprises receiving from the second CP entity an authorization response indicating whether the application of the policy rule for the data session between the UE and the AS is accepted or rejected. In some embodiments the session management entity is a SMF. In some embodiments, the second CP entity is a PCF.

In some embodiments, the CP entity is a policy control entity, the mobile communication entity is a second CP entity, the authorizing step comprises retrieving from a user data repository the policy rules that apply for the data sessions between the UE and the AS, and the authorizing steps comprises comparing the policy rule with the policy rules retrieved from the user data repository. In some embodiments the policy control entity is a PCF. In some embodiments, the user data repository is a UDR.

At step 703, the CP entity sends to the mobile communication entity an authorization response indicating whether the policy rule for the data session between the UE and the AS is accepted or rejected.

Figure 8:
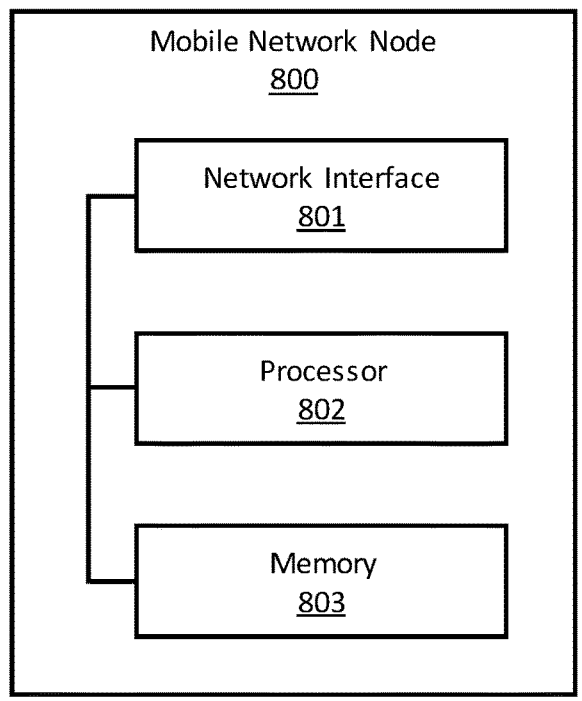
FIG. 8 is a block diagram of a mobile network node configured in accordance with some embodiments of the solution described herein.

FIG. 8 is a block diagram illustrating elements of a mobile network node 800 of a communication network configured to provide cellular communication according to some embodiments. As shown, the mobile network node may include network interface circuitry 801 (also referred to as a network interface) configured to provide communications with other nodes of the core network and/or the network. The mobile network node may also include a processing circuitry 802 (also referred to as a processor) coupled to the network interface circuitry, and memory circuitry 903 (also referred to as memory) coupled to the processing circuitry. The memory circuitry 803 may include computer readable program code that when executed by the processing circuitry 802 causes the processing circuitry to perform operations according to embodiments disclosed herein. According to other embodiments, processing circuitry 802 may be defined to include memory so that a separate memory circuitry is not required.

As discussed herein, operations of the mobile network node may be performed by processing circuitry 802 and/or network interface circuitry 801. For example, processing circuitry 902 may control network interface circuitry 801 to transmit communications through network interface circuitry 801 to one or more other network nodes and/or to receive communications through network interface circuitry from one or more other network nodes. Moreover, modules may be stored in memory 803, and these modules may provide instructions so that when instructions of a module are executed by processing circuitry 802, processing circuitry 802 performs respective operations (e.g., operations discussed below with respect to Example Embodiments relating to core network nodes).

In some embodiments, the mobile network node 800 is a UPF.

Figure 9:
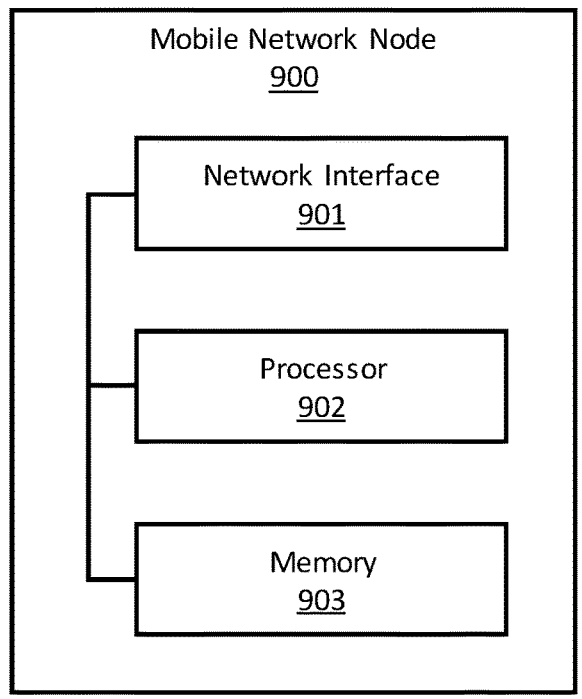
FIG. 9 is a block diagram of a mobile network node configured in accordance with some embodiments of the solution described herein.

FIG. 9 is a block diagram illustrating elements of a mobile network node 900 of a communication network configured to provide cellular communication according to some embodiments. As shown, the mobile network node may include network interface circuitry 901 (also referred to as a network interface) configured to provide communications with other nodes of the core network and/or the network. The mobile network node may also include a processing circuitry 902 (also referred to as a processor) coupled to the network interface circuitry, and memory circuitry 903 (also referred to as memory) coupled to the processing circuitry. The memory circuitry 903 may include computer readable program code that when executed by the processing circuitry 902 causes the processing circuitry to perform operations according to embodiments disclosed herein. According to other embodiments, processing circuitry 902 may be defined to include memory so that a separate memory circuitry is not required.

As discussed herein, operations of the mobile network node may be performed by processing circuitry 902 and/or network interface circuitry 901. For example, processing circuitry 902 may control network interface circuitry 901 to transmit communications through network interface circuitry 901 to one or more other network nodes and/or to receive communications through network interface circuitry from one or more other network nodes. Moreover, modules may be stored in memory 903, and these modules may provide instructions so that when instructions of a module are executed by processing circuitry 902, processing circuitry 902 performs respective operations (e.g., operations discussed below with respect to Example Embodiments relating to core network nodes).

In some embodiments, the mobile network node 900 is a SMF. In some embodiments, the mobile network node 900 is a PCF.

Figure 10:
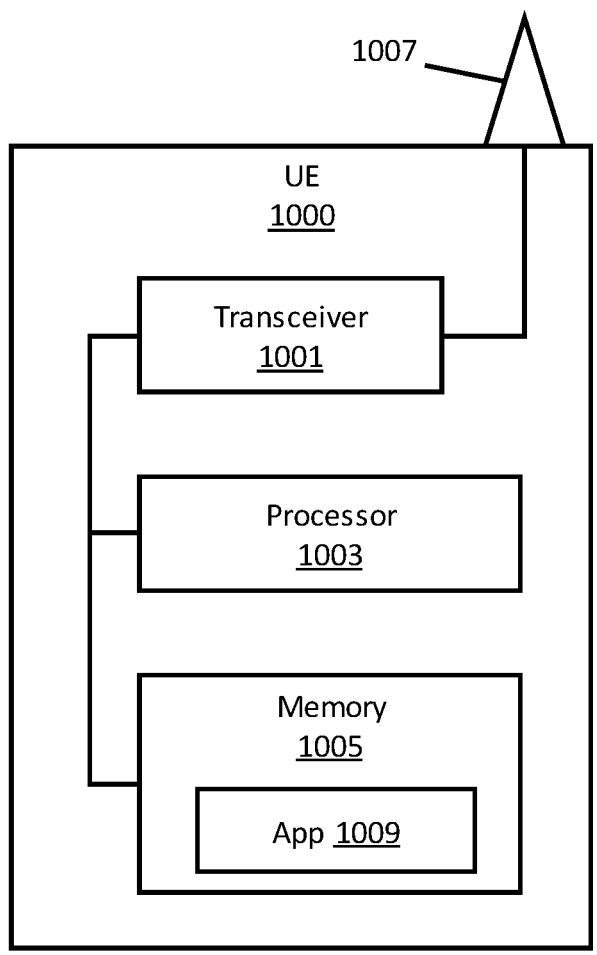
FIG. 10 is a block diagram of a UE configured in accordance with some embodiments of the solution described herein.

FIG. 10 is a block diagram illustrating elements of a UE 1000 (also referred to as a communication device, a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of the disclosure. As shown, communication device UE may include an antenna 1007, and transceiver circuitry 1001 (also referred to as a transceiver) including a transmitter and a receiver configured to provide uplink and downlink radio communications with a base station(s) (also referred to as a RAN node) of a radio access network. The UE may also include processing circuitry 1003 (also referred to as a processor) coupled to the transceiver circuitry, and memory circuitry 1005 (also referred to as memory, e.g. corresponding to device readable medium) coupled to the processing circuitry. The memory circuitry 1005 may include computer readable program code, such as application client 1009, that when executed by the processing circuitry 1003 causes the processing circuitry to perform operations according to embodiments disclosed herein. According to other embodiments, processing circuitry 1003 may be defined to include memory so that separate memory circuitry is not required. The UE 1000 may also include an interface (such as a user interface) coupled with processing circuitry 1003, and/or the UE may be incorporated in a vehicle.

As discussed herein, operations of the UE may be performed by processing circuitry 1003 and/or transceiver circuitry 1001. For example, processing circuitry 1003 may control transceiver circuitry 1001 to transmit communications through transceiver circuitry 1001 over a radio interface to a radio access network node (also referred to as a base station) and/or to receive communications through transceiver circuitry 1001 from a RAN node over a radio interface. Moreover, modules may be stored in memory circuitry 1005, and these modules may provide instructions so that when instructions of a module are executed by processing circuitry 1003, processing circuitry 1003 performs respective operations (e.g., the operations disclosed herein with respect to the example embodiments relating to the UE).

The invention claimed is:

1. A method for providing a policy rule to a mobile communication system, wherein the policy rule is applicable to a data session between a user equipment (UE) and an application server (AS) and is enforceable at a user plane (UP) entity of the mobile communication system, the method comprising:
the UE establishing a communication channel with the UP entity of the mobile communication system, wherein a policy API sits between the UE and a Collaborative Performance Enhancement (COPE) entity in the mobile communication system to allow a content provider to request policies relative to application traffic in the AS; and
the UE sending the policy rule through the communication channel to the UP entity, wherein the Policy API is terminated at a Session Management Function (SMF) by configuring the UP to forward to the SMF, the policy request from the content provider, and wherein the UP decrypts the policy request from the content provider before forwarding it to the SMF.

2. The method of claim 1, wherein the policy rule is sent together with information for identifying and classifying at the UP entity the traffic of the data session between the UE and the AS.

3. The method of claim 1, wherein the communication channel is established at an application level, the data session between the UE and the AS is at application level, and the UP entity acts as application level proxy in the communication between the UE and the AS.

4. The method of claim 3, wherein a communication channel protocol of the established communication channel corresponds to Quick User Datagram Protocol Internet Connections (QUIC) protocol, and the data session corresponds to a QUIC connection.

5. The method of claim 1, wherein the communication channel is established at network level, the data session between the UE and the AS is at network level, and the UP entity acts as a network level gateway in the communication between the UE and the AS.

6. The method of claim 5, wherein a communication channel protocol of the established communication channel corresponds to General Packet Radio Service Tunnelling Protocol (GTP), and the data session corresponds to a Packet Data Unit session.

7. The method of claim 1, further comprising:
receiving from the UP entity, an indication of whether the policy rule is accepted or rejected by the mobile communication system.

8. A method for handling a policy rule sent from a user equipment (UE) to a mobile communication system, wherein the policy rule is applicable to a data session between the UE and an application server (AS) and is enforceable at a user plane (UP) entity; the method being performed by UP entity and comprising:
establishing a communication channel with the UE, wherein a policy API sits between the UE and a Collaborative Performance Enhancement (COPE) entity at a network operator to allow a content provider to request policies relative to application traffic in the AS; and
the UE entity receiving the policy rule transmitted by the UE via the communication channel, wherein the Policy API is terminated at a control plane (CP) entity by configuring the UP to forward to the CP entity, the policy request from the content provider, and wherein the UP decrypts the policy request from the content provider before forwarding it to the CP entity.

9. The method of claim 8, wherein the policy rule is received together with information for identifying and classifying at the UP entity the traffic of the data session between the UE and the AS.

10. The method of claim 8, wherein the communication channel is established at an application level, the data session between the UE and the AS is at application level, and the UP entity acts as application level proxy in the communication between the UE and the AS.

11. The method of claim 10, wherein a communication channel protocol of the established communication channel corresponds to Quick User Datagram Protocol Internet Connections (QUIC) protocol, and the data session corresponds to a QUIC connection.

12. The method of claim 8, wherein the communication channel is established at network level, the data session between the UE and the AS is at network level, and the UP entity acts as a network level gateway in the communication between the UE and the AS.

13. The method of claim 12, wherein a communication channel protocol of the established communication channel corresponds to General Packet Radio Service Tunnelling Protocol (GTP), and the data session corresponds to a Packet Data Unit session.

14. The method of claim 8, further comprising:
sending to the UE, an indication of whether the policy rule is accepted or rejected by the mobile communication system.

15. The method of claim 8, further comprising:
authorizing the application of the policy rule for the data session between the UE and the AS.

16. The method of claim 15, wherein the authorizing step comprises sending to the CP entity an authorization request for the policy rule for the data session between the UE and the AS and receiving the corresponding authorization response from the CP entity.

17. The method of claim 16, wherein the CP entity is a session management entity.

18. The method of claim 8, further comprising:
sending to the CP entity an authorization request for the policy rule for the data session between the UE and the AS.

19. A computing unit configured to execute a user plane (UP) entity of a mobile communication system for providing a policy rule from a user equipment (UE) to the mobile communication system, being the policy rule applicable to a data session between the UE and an application server (AS), and being the policy rule enforceable at the UP entity, the computing unit configured to perform the method of claim 8.

20. A user equipment (UE) for providing a policy rule to a mobile communication system, being the policy rule applicable to a data session between the UE and an application server (AS), and being the policy rule enforceable at a user plane (UP) entity, the UE comprising a circuitry configured to:
establish a communication channel with the UP entity of the mobile communication system, wherein a policy API sits between the UE and a Collaborative Performance Enhancement (COPE) entity in the mobile communication system to allow a content provider to request policies relative to application traffic in the AS; and
send the policy rule through the communication channel to the UP entity, wherein the Policy API is terminated at a Session Management Function (SMF) by configuring the UP to forward to the SMF, the policy request from the content provider, and wherein the UP decrypts the policy request from the content provider before forwarding it to the SMF.

* * * * *